United States Patent
Hofer et al.

(10) Patent No.: US 10,339,918 B2
(45) Date of Patent: Jul. 2, 2019

(54) ADAPTIVE SPEECH ENDPOINT DETECTOR

(71) Applicant: Intel Corporation, Santa Clara, CA (US)

(72) Inventors: Joachim Hofer, Munich (DE); Munir Georges, Kehl (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/277,164

(22) Filed: Sep. 27, 2016

(65) Prior Publication Data
US 2018/0090127 A1    Mar. 29, 2018

(51) Int. Cl.
| | | |
|---|---|---|
| *G10L 15/00* | (2013.01) | |
| *G10L 15/16* | (2006.01) | |
| *G10L 15/22* | (2006.01) | |
| *G10L 15/04* | (2013.01) | |
| *G10L 15/07* | (2013.01) | |
| *G10L 25/87* | (2013.01) | |
| *G10L 25/78* | (2013.01) | |

(52) U.S. Cl.
CPC .............. *G10L 15/04* (2013.01); *G10L 15/07* (2013.01); *G10L 15/22* (2013.01); *G10L 25/87* (2013.01); *G10L 2025/786* (2013.01)

(58) Field of Classification Search
CPC .......... G10L 15/00; G10L 15/16; G10L 15/22
USPC ........................................ 704/232, 235, 253
See application file for complete search history.

(56) References Cited

U.S. PATENT DOCUMENTS

| | | | | |
|---|---|---|---|---|
| 6,757,652 | B1* | 6/2004 | Lund ...................... | G10L 15/32 704/252 |
| 9,437,186 | B1* | 9/2016 | Liu .......................... | G10L 15/05 |
| 9,922,640 | B2* | 3/2018 | Rao ......................... | G10L 15/04 |
| 10,043,521 | B2* | 8/2018 | Bocklet ................... | G10L 17/04 |
| 2002/0082831 | A1* | 6/2002 | Hwang ................... | G10L 15/063 704/249 |
| 2004/0121812 | A1* | 6/2004 | Doran ..................... | G10L 25/87 455/563 |
| 2005/0102139 | A1* | 5/2005 | Fukada ................... | G06K 9/6293 704/235 |

(Continued)

FOREIGN PATENT DOCUMENTS

WO        9422131 A2       9/1994

OTHER PUBLICATIONS

Chung et al., "Endpoint Detection using Weighted Finite State Transducer", INTERSPEECH, 2013, pp. 700-703.*

(Continued)

*Primary Examiner* — Seong-Ah A Shin
(74) *Attorney, Agent, or Firm* — Jordan IP Law, LLC (57) ABSTRACT

An embodiment of a speech endpoint detector apparatus may include a speech detector to detect a presence of speech in an electronic speech signal, a pause duration measurer communicatively coupled to the speech detector to measure a duration of a pause following a period of detected speech, an end of utterance detector communicatively coupled to the pause duration measurer to detect if the pause measured following the period of detected speech is greater than a pause threshold corresponding to an end of an utterance, and a pause threshold adjuster to adaptively adjust the pause threshold corresponding to an end of an utterance based on stored pause information. Other embodiments are disclosed and claimed.

21 Claims, 6 Drawing Sheets

(56) References Cited

U.S. PATENT DOCUMENTS

| | | | |
|---|---|---|---|
| 2006/0136207 A1* | 6/2006 | Kim | G10L 15/08 704/249 |
| 2011/0307257 A1* | 12/2011 | Pereg | G06Q 10/063 704/251 |
| 2012/0271634 A1* | 10/2012 | Lenke | G10L 15/22 704/251 |
| 2013/0197911 A1* | 8/2013 | Wei | G10L 25/87 704/235 |
| 2014/0222430 A1* | 8/2014 | Rao | G10L 15/04 704/254 |
| 2014/0337024 A1* | 11/2014 | Zuo | G10L 15/1822 704/239 |
| 2015/0170640 A1* | 6/2015 | Sak | G10L 15/16 704/232 |
| 2015/0206544 A1* | 7/2015 | Carter | G10L 25/78 704/235 |
| 2016/0093292 A1 | 3/2016 | Hofer et al. | |
| 2016/0098986 A1 | 4/2016 | Hofer et al. | |
| 2016/0379632 A1* | 12/2016 | Hoffmeister | G10L 15/18 704/253 |
| 2017/0069309 A1* | 3/2017 | Aleksic | G10L 15/26 |
| 2018/0005633 A1* | 1/2018 | Bocklet | G10L 17/04 |

OTHER PUBLICATIONS

Chung et al., "Endpoint detection using weighted finite state transducer"; INTERSPEECH. 2013. (Year: 2013).*

Li, et al., "Robust Endpoint Detection and Energy Normalization for Real-Time Speech and Speaker Recognition," IEEE Transactions on Speech and Audio Processing, vol. 10, No. 3 (Mar. 2002).

International Search Report and Written Opinion for International Patent Application No. PCT/US2017/048980, dated Dec. 28, 2017, 11 pages.

International Preliminary Report on Patentability for International Patent Application No. PCT/US2017/048980, dated Apr. 11, 2019, 8 pages.

* cited by examiner

| 0 | - | |
| 1 | - | |
| 2 | - | |
| 3 | - | |
| 4 | open | 1.1 |
| 5 | - | |
| 6 | the | 0.6 |
| 7 | - | |
| 8 | - | |
| 9 | - | |
| A | open the | 0.3 |
| B | - | |
| C | - | |
| D | the door | 1.2 |
| E | - | |
| F | - | |

ADAPTIVE SPEECH ENDPOINT DETECTOR

TECHNICAL FIELD

Embodiments generally relate to speech recognition. More particularly, embodiments relate to an adaptive speech endpoint detector.

BACKGROUND

The article entitled "Robust Endpoint Detection and Energy Normalization for Real-Time Speech and Speaker Recognition," by Qi Li, et al., published in IEEE TRANSACTIONS ON SPEECH AND AUDIO PROCESSING, VOL. 10, NO. 3, MARCH 2002, describes how endpoint detection and energy normalization can be important to the functioning of an automatic speech recognition and/or speaker verification systems. The described system uses a filter plus a three-state transition diagram for endpoint detection. The described filter is designed utilizing several criteria to ensure accuracy and robustness. The detected endpoints are then applied to energy normalization sequentially.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
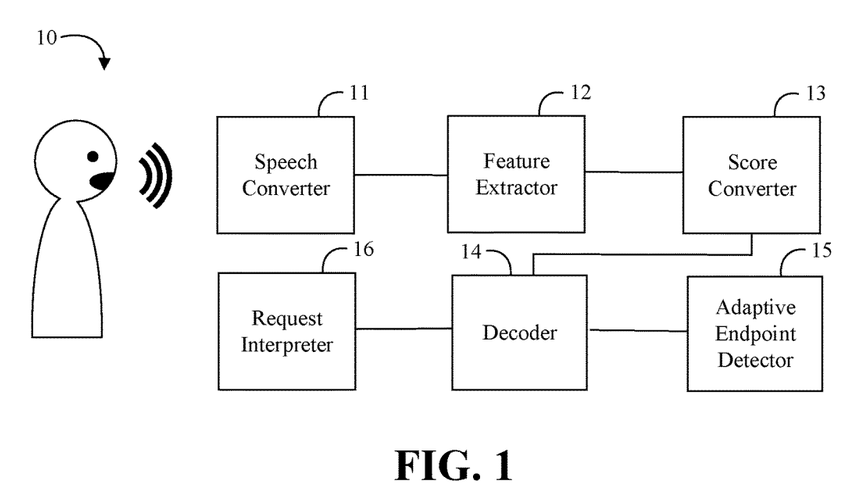
FIG. 1 is a block diagram of an example of a speech recognition system according to an embodiment.

Turning now to FIG. 1, an embodiment of a speech recognition system 10 may include a speech converter 11 to convert speech from a user into an electronic signal, a feature extractor 12 (e.g., an acoustic feature extractor) communicatively coupled to the speech converter 11 to extract speech features from the electronic signal, a score converter 13 communicatively coupled to the feature extractor 12 to convert the speech features into scores of phonetic units, a decoder 14 (e.g., a weighted finite state transducer/ WFST based decoder) communicatively coupled to the score converter 13 to decode a phrase spoken by the user based on the phonetic scores, an adaptive endpoint detector 15 communicatively coupled to the decoder 14 to determine if the decoded phrase spoken by the user corresponds to a complete request, and a request interpreter 16 communicatively coupled to the decoder 14 to interpret the request from the user. For example, the adaptive endpoint detector 15 may be further configured to retrieve pause statistics associated with the user and to adjust a pause threshold based on the pause statistics associated with the user. The adaptive endpoint detector 15 may also be further configured to retrieve pause statistics associated with a word, phrase, and/or other contextual interpretation and to adjust the pause threshold based on the decoded phrase spoken by the user and the pause statistics associated with the word/phrase/other contextual interpretation.

Non-limiting examples of devices that may utilize the speech recognition system 10 include a server, a computer, a smart device, a gaming console, a wearable device, an internet-of-things (IoT) device, a kiosk, a robot, an automated voice response system, and any human machine interface device that includes voice input as part of its user interaction experience. Embodiments of each of the above speech converter 11, feature extractor 12, score converter 13, decoder 14, adaptive endpoint detector 15, request interpreter 16, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively, or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object oriented programming language such as JAVA, Python, SMALLTALK, C++ or the like and conventional procedural programming languages, such as the "C" programming language or similar programming languages.

Figure 2:
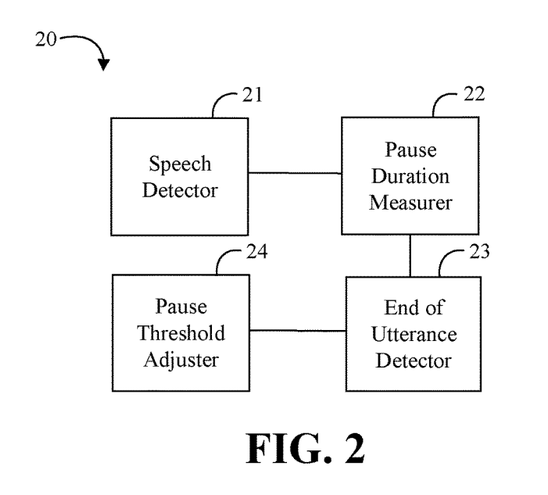
FIG. 2 is a block diagram of an example of a speech endpoint detector according to an embodiment.

Turning now to FIG. 2, an embodiment of a speech endpoint detector apparatus 20 may include a speech detector 21 to detect a presence of speech in an electronic speech signal, a pause duration measurer 22 communicatively coupled to the speech detector 21 to measure a duration of a pause following a period of detected speech, an end of utterance detector 23 communicatively coupled to the pause duration measurer 22 to detect if the pause measured following the period of detected speech is greater than a pause threshold corresponding to an end of an utterance, and a pause threshold adjuster 24 communicatively coupled to the end of utterance detector 23 to adaptively adjust the pause threshold corresponding to an end of an utterance based on stored pause information. The speech endpoint detector apparatus 20 may find particular utility in a speech recognition system such as, for example, the speech recognition system 10 from FIG. 1. In some embodiments, the pause threshold may be adaptive within a range, for example, between a pre-determined minimum pause threshold and maximum pause threshold.

In some embodiments of the speech detector apparatus 20, the speech detector 21 may be a part of the WFST decoder that bases speech/non-speech classification on the WFST state that the best active token is currently in. In different embodiments, the speech detector 21 may be an individual classifier, for example, operating on the acoustic signal or the features from the feature extractor 12. It is also possible to use other features. For example, some synchronous video information that captures the mouth movement to detect speech/non-speech sections or similar information from a noise cancelation algorithm.

In some embodiments of the speech endpoint detector apparatus 20, the stored pause information may include one or more of pause information associated with a user or pause information associated with one or more contextual interpretations. The contextual interpretation may include a word or phrase context. The contextual interpretation may also be based on an environmental context. For example, the pause can be longer in a distractive environment like driving a car very fast. Another example is when the user exhibits a stress-full behavior. The environmental context may be determined by sensors (e.g., biometric sensors), other stress-level metrics, moving behavior, and/or noise level (e.g., like crying kids in the background).

For example, the pause threshold adjuster 24 may be further configured to store the measured duration of pauses in the detected speech in the stored pause information associated with the user/contextual interpretation/situation and to adjust the pause threshold based on the stored pause durations associated with the user/contextual interpretation/situation. The pause threshold adjuster 24 may also be further configured to determine statistics of pause durations, and the stored pause information associated with an identified user may include a database of pause statistics associated with the identified user. In some embodiments of the apparatus 20, the stored pause information may include a database having at least two sets of pause statistics respectively associated with at least two identified users. In addition, or alternatively, in some embodiments of the speech endpoint detector apparatus 20 the stored pause information associated with one or more phrase contexts may include pause statistics corresponding to the one or more phrase contexts and the stored pause information may include pause information stored in a finite state transducer (e.g., as described in more detail below).

For example, a voice command sequence may involve a wake-up phrase, followed by a pause, followed by a voice query. The pause in some embodiments may be longer than usual because the user may wait for some visual or other feedback that the device is now really listening to the user (e.g., a robot turns its head to the speaker). In other embodiments, the user may wait until a certain program/behavior becomes visible to the user. In some embodiments, a ready indication may additionally or alternatively include a jingle or decreasing audio-level when music is being played by the same device.

Embodiments of each of the above speech detector 21, pause duration measurer 22, end of utterance detector 23, pause threshold adjuster 24, and other components of the speech endpoint detector apparatus 20 may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, Python, SMALLTALK, C++ or the like and conventional procedural programming languages, such as the "C" programming language or similar programming languages.

Figure 3A:
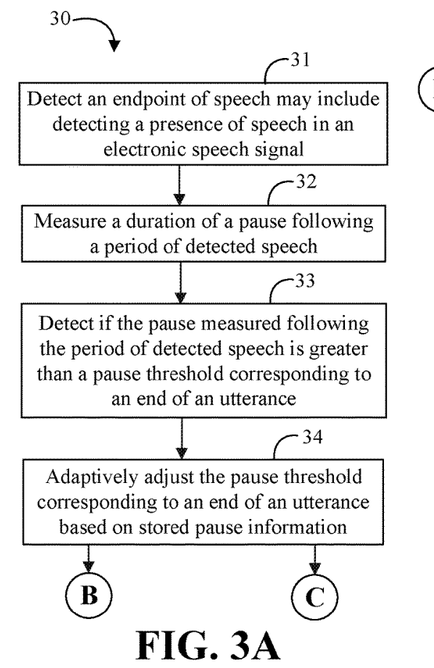
FIGS. 3A to 3C are flowcharts of an example of a method of detecting an endpoint of speech according to an embodiment.
Figure 3B:
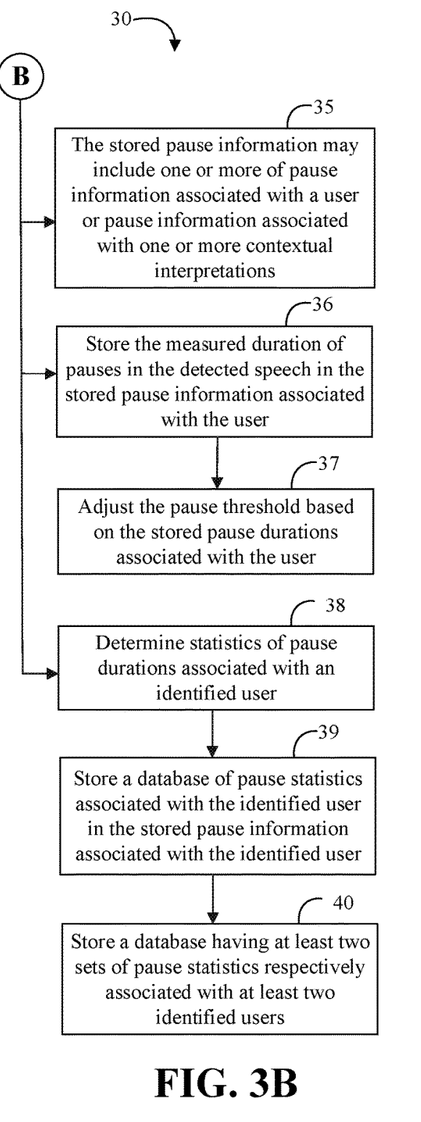
Figure 3C:
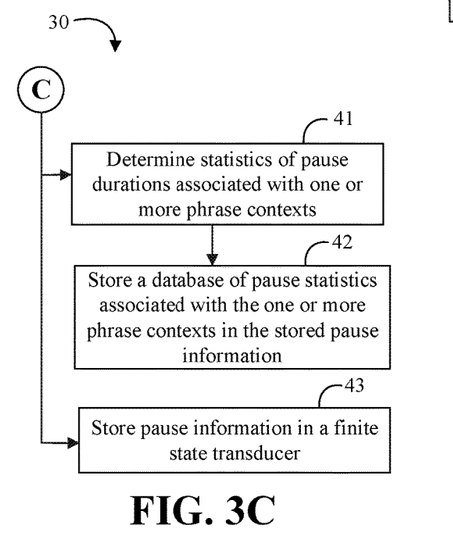

Turning now to FIGS. 3A to 3C, an embodiment of a method 30 of detecting an endpoint of speech may include detecting a presence of speech in an electronic speech signal at block 31, measuring a duration of a pause following a period of detected speech at block 32, detecting if the pause measured following the period of detected speech is greater than a pause threshold corresponding to an end of an utterance at block 33, and adaptively adjusting the pause threshold corresponding to an end of an utterance based on stored pause information at block 34. For example, the stored pause information may include one or more of pause information associated with a user or pause information associated with one or more contextual interpretations at block 35.

Some embodiments of the method 30 may further include storing the measured duration of pauses in the detected speech in the stored pause information associated with the user at block 36, and adjusting the pause threshold based on the stored pause durations associated with the user at block 37. The method 30 may also further include determining statistics of pause durations associated with an identified user at block 38, and storing a database of pause statistics associated with the identified user in the stored pause information associated with the identified user at block 39. For example, the method 30 may also further include storing a database having at least two sets of pause statistics respectively associated with at least two identified users at block 40. Alternatively, or additionally, some embodiments may utilize a machine learning approach to learn pauses given a context. Suitable machine learning algorithms may be, for example, based on recurrent neuronal networks (RNN).

Some embodiments of the method 30 may further include determining statistics of pause durations associated with one or more phrase contexts at block 41, and storing a database of pause statistics associated with the one or more phrase contexts in the stored pause information at block 42. For example, the method 30 may alternatively or additionally further include storing pause information in a finite state transducer at block 43.

Embodiments of the method 30 may be implemented in a speech recognition system or speech endpoint detector apparatus such as, for example, those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, Python, SMALLTALK, C++ or the like and conventional procedural programming languages, such as the "C" programming language or similar programming languages. For example, the method 30 may be implemented on a computer readable medium as described in connection with Examples 18 to 24 below.

Machines with a spoken human machine interface (e.g., wearable devices, home automation, personal assistants) may have to determine whether a user completed his/her request or whether the user is still speaking. If the machine waits too long after the user input, the latency has a negative impact on the user experience. If the machine reacts too fast, it may interrupt a user or may misunderstand a user by evaluating incomplete requests. Such an interruption may happen for a user making short pauses or hesitations during requests. Also speech disfluency may cause the user to make pause variations. A conventional speech recognition system may use a fixed time threshold as a compromise between responsiveness and robustness. If the chosen time is short, the system may interrupt a short pause made by the speaker or attempt to process an incomplete request. If the chosen time is long, the response time of the system may be perceived as slow. Both cases may result in a bad user experience.

Advantageously, a speech recognition system according to some embodiments may provide adaptive and context aware speech disfluency handling for human machine interfaces. For example, some embodiments may adapt the response time of the machine based on the currently spoken request and on the average conversation speed of the current user. Other benefits of some embodiments may include improved responsiveness of the system, slow speakers not being interrupted, and/or improved user experience by evaluating complete requests more precisely.

In some embodiments, improving the response time may be accomplished by one or a combination of techniques. One technique may involve (e.g., for all user requests) a speech recognition system to determine statistics of pauses (e.g., hesitations or disfluencies) for each user input. The wait time of the speech recognition system for a particular user input may then be adjusted according to those statistics. With appropriate adjustment of the wait time, the system advantageously responds quicker for fast speakers while waiting longer for disfluent speakers. Another technique may involve adjusting the wait time based on the context of previously spoken words or phrases. For example, after the user says "open it", a short pause usually indicates that the sentence is finished. On the other hand, a short pause after the user says "could you" usually doesn't indicate that the sentence is finished. Advantageously, the statistics of pauses may be estimated separately for different words, phrases, and/or sentences. For example, an initial set of statistics may be estimated based on audio recordings from a large set of speakers and may thereafter be adapted at run-time to each individual user. In some embodiments, a particular environment context may also adjust the wait time and/or determination that the user completed the request. For example, a camera may detect that the user is deflected such that the system may wait until the user re-engages to conclude their voice query. This may happen, for example, when the user drives a car and needs to react on a changing traffic condition. Some embodiments of a speech recognition system may utilize combinations of these techniques.

Conventional systems may involve a substantial compromise to give somewhat acceptable experiences for fluent and disfluent speakers. The postponed module, e.g., the dialog engine, may need to be able to handle a relatively large number of incomplete user requests. This problem increases the complexity of the design of the user interface and negatively impacts on the user experience. Advantageously, some embodiments may improve the response time of the system, especially for fluent speakers, while minimizing interruptions of slow or disfluent speakers. In some embodiments, more user requests may be completely recognized and the user experience may be improved for all or most speakers. With relatively fewer incomplete user requests to process, the user interface may advantageously be less complex to design.

Figure 4:
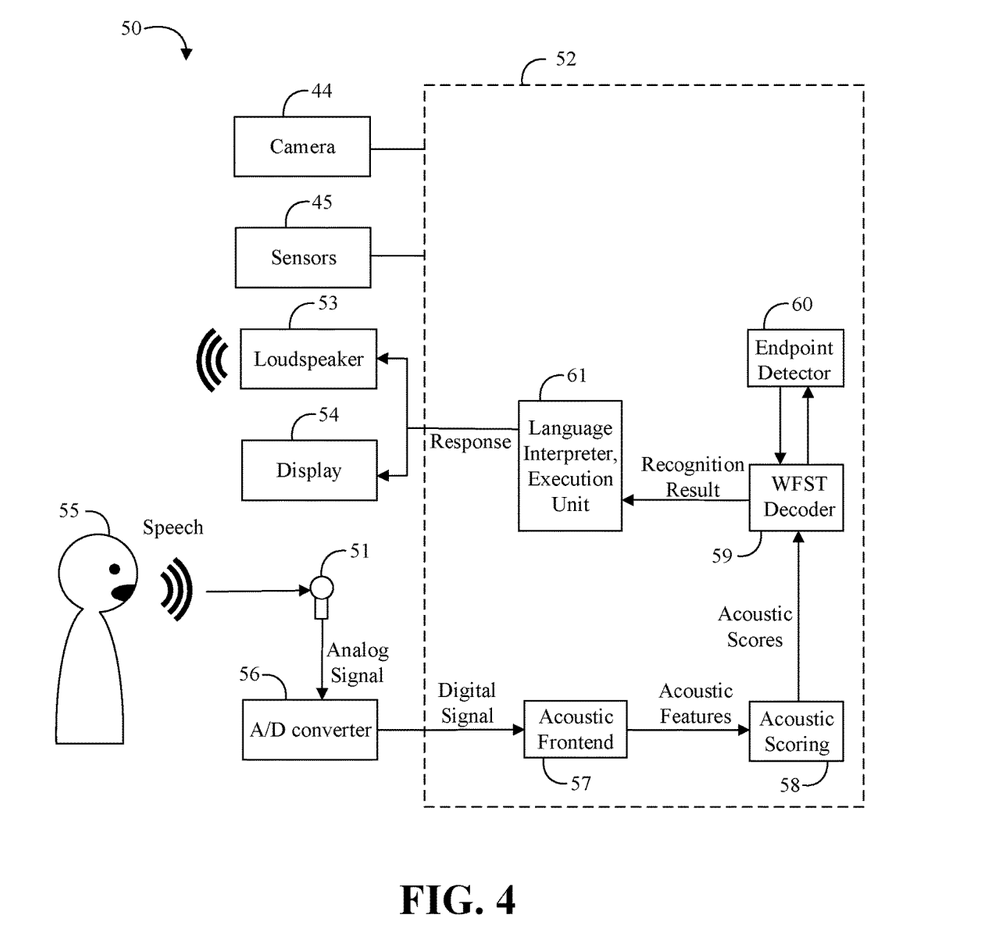
FIG. 4 is a block diagram of another example of a speech recognition system according to an embodiment.

Turning now to FIG. 4, a speech enabled human machine interface (HMI) system 50 may include a camera 44 and other sensors 45 coupled to a processor 52 to capture and interpret an environmental or situational context. For example, some embodiments of the speech enabled HMI system 50 may incorporate video or other sensor information to determine if the user is still talking to the system 50 (e.g., by evaluating a video signal and/or analyzing the mouth movement). The system 50 may also record audio with a microphone 51, process the acoustic data with the processor 52, and then output speech (e.g., via loudspeaker 53) or visual information (e.g., via display 54) to the user or execute commands based on the user's request. The speech from a user 55 may be captured by the microphone 51 and converted into digital signals by an analog-to-digital (A/D) converter 56 before being processed by the processor 52. The processor 52 may include an acoustic frontend 57 to extract acoustic features, which may then be converted into acoustic scores of phonetic units by an acoustic scorer 58. Those acoustic scores may then be provided to a decoder 59 (e.g., based on WFST) to determine the phrase spoken by the user 55.

An endpoint detector 60 may be coupled to the decoder 59 to determine whether the user has finished their request. The recognition result from the decoder 59 may be provided to a language interpreter/execution unit 61 to process the user request and make an appropriate response (e.g., via the loudspeaker 53 and/or the display 54). Advantageously, the endpoint detector 60 may be configured to improve the response time of the system 50 and also to reduce the number of interruptions by utilizing an adaptive and/or context aware time threshold for endpoint detection.

As an example of how the time threshold may be adaptively adjusted based on the conversation speed of the user during operation of an embodiment of the system 50, the durations of all pauses between words of the user may be determined using an endpoint detection algorithm. Those pause duration values may be stored in a database. The values in the database may then be utilized to derive a new time threshold to determine the end of a phrase. As an example, the adapted new time threshold could be set to be ten percent (10%) larger than the longest pause between words stored in the database. Alternatively, a suitable distribution like, for example, a Gaussian distribution can be fitted to the pause duration data stored in the database. The adapted new time threshold can be derived from this distribution, for example, by taking the ninety-ninth percentile (99%). The adapted new time threshold can also be learned through reinforcement, for example, when the user acknowledges the recognized voice-query. The acknowledgement may happen via haptic user interaction, or when the user doesn't complain about the query itself.

As an example of how the time threshold may be adaptively adjusted based on the context of what was spoken during operation of an embodiment of the system 50, an audio database of spoken phrases may be utilized to determine statistics of pause durations after partially spoken phrases. Only pauses within the partial phrases are considered. Pauses at the end of a complete phrase are not used. As an example, for every partial phrase consisting of n words (n-gram) that was at least spoken by m different speakers, the maximum pause duration after that partial phrase is computed and stored. The wait time threshold for this partial phrase can then be set ten percent (10%) longer than the longest corresponding partial phrase pause duration stored in the database.

As in the case of the conversation speed-based adaptive time threshold, more elaborate methods to derive a context-based adaptive time threshold from the data may be utilized. During runtime, for example, endpoint detection may be based on the time threshold for the longest partial phrase of the current recognition hypothesis of the decoder. An example current recognition hypothesis may be "open the door". Assuming that pause duration statistics exist for "the door" and "door", but not for "open the door", the pause threshold from the partial phrase "the door" may be used to determine whether an endpoint was detected. Additionally, or alternatively, a phrase hypotheses context may be represented by an n-best list or a lattice and may not even contain the syntactical (but sub/phonetical) word sequence.

The context sensitive threshold may be also adapted to the user similar to the case with just a conversation speed-based threshold. For example, a static database of context sensitive pause durations may be stored alongside a database with context sensitive pause durations of the current user. For a given partial phrase, the time threshold of the static database and the user defined database may be interpolated based on the amount of samples present in the user defined database. That way, the context-based time threshold may also adapt to the user's speaking habits. The database may not necessarily correspond to a relational database. In some embodiments, the database may include one or more of a relational database, a graphical relationship, or a function mapping speech features to an expected pause duration. A suitable function may be, for example, a non-linear function trained using a machine learning approach (e.g., such as RNN).

Figure 5:
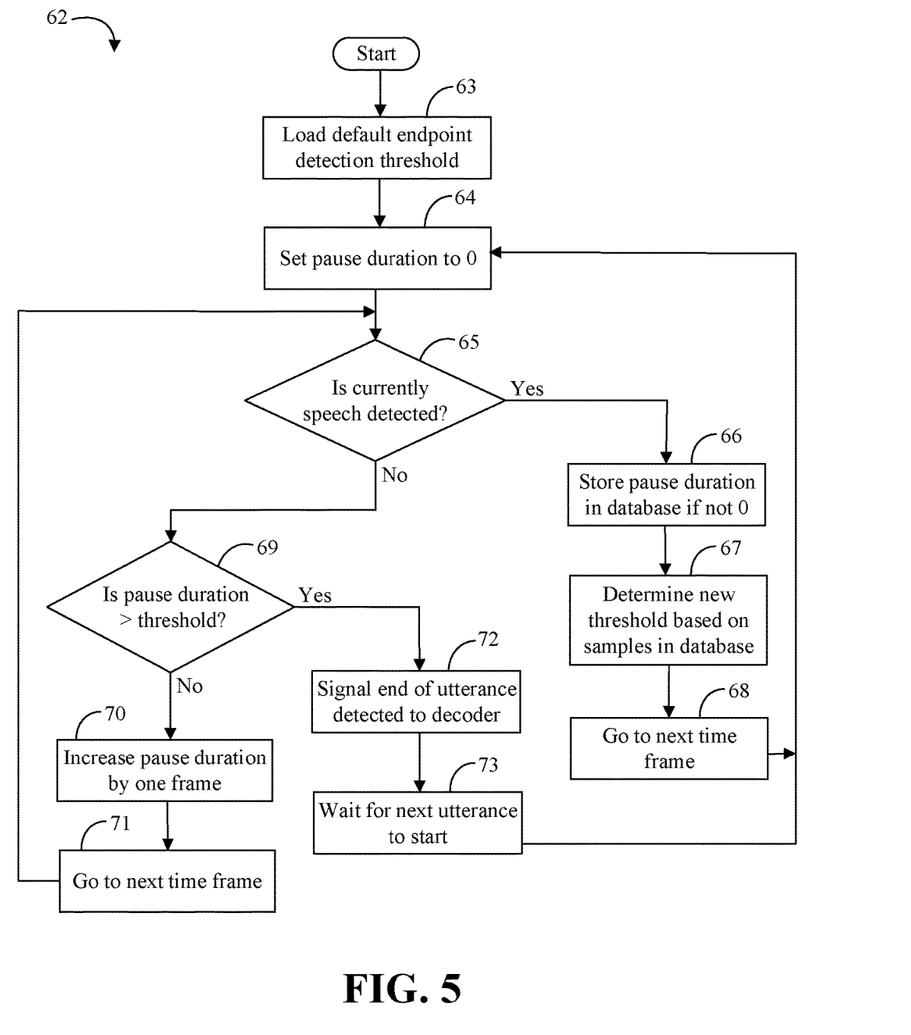
FIG. 5 is a flowchart of another example of a method of detecting an endpoint of speech according to an embodiment.

Turning to FIG. 5, a conversation speed-based adaptive method 62 of detecting an endpoint of speech may include loading a default endpoint detection threshold at block 63 and setting an initial value for the current pause duration to zero (0) at block 64. If speech is currently detected at block 65, then any non-zero value for the current pause duration sample is stored in a database at block 66 (e.g., corresponding to the measured pause duration between the prior spoken word and a just started new spoken word), a new endpoint detection threshold may be determined based on the samples stored in the database at block 67, and processing may continue at the next time frame at block 68. From block 68, the method 62 returns to block 64 (e.g., where the current pause duration is set to zero while speech continues to be detected at block 65).

If speech is not currently detected at block 65, the current pause duration is compared to the endpoint detection threshold at block 69. If the current pause duration is less than or equal to the endpoint detection threshold at block 69, the current pause duration may be increased by one (1) time frame at block 70 and processing may continue at the next time frame at block 71. From block 71, the method 62 returns to block 65 (e.g., where the current pause duration continues to increase while speech is not detected). If the current pause duration is greater than the endpoint detection threshold at block 69, an end of utterance signal may be provided to the decoder at block 72 and the method 62 may wait for the next utterance to start at block 73. When the next utterance starts at block 73, processing may continue at block 64.

Figure 6:
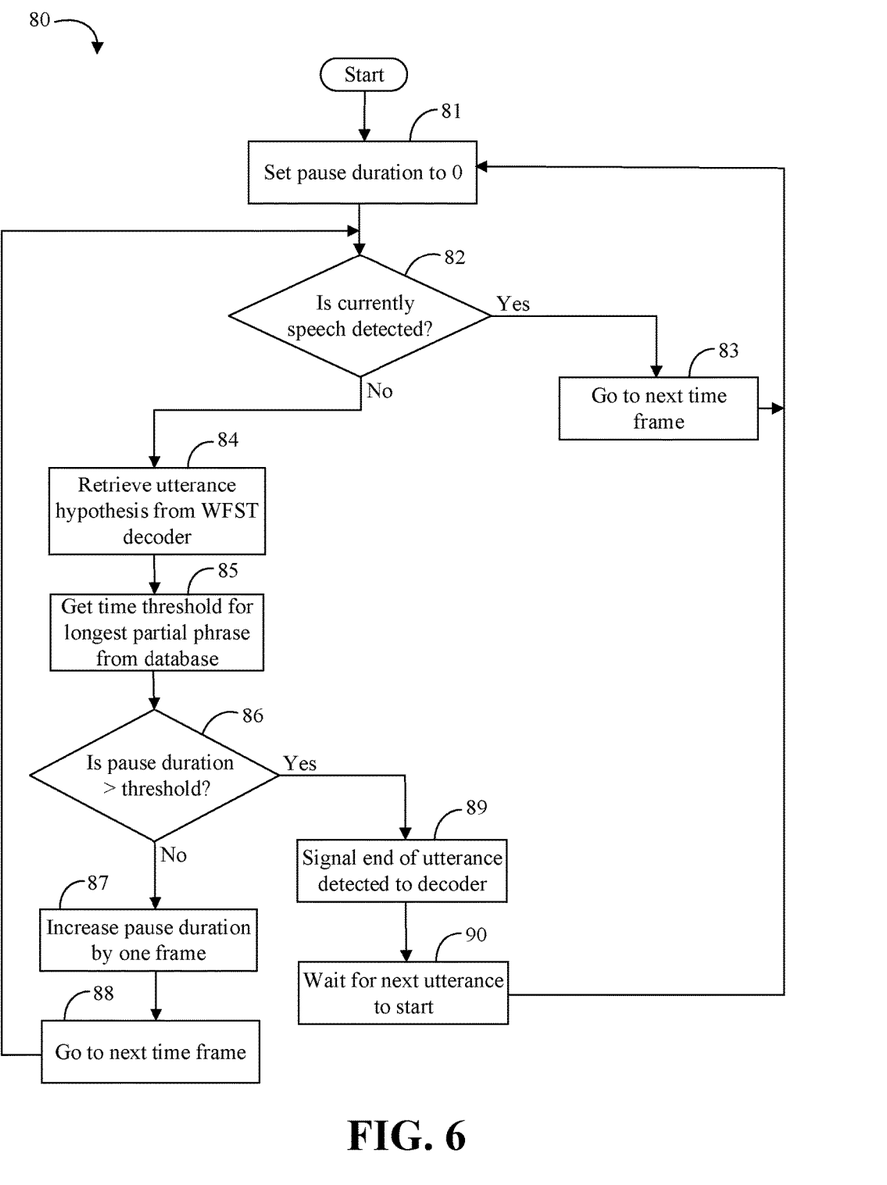
FIG. 6 is a flowchart of another example of a method of detecting an endpoint of speech according to an embodiment.

Turning now to FIG. 6, a context-based adaptive method 80 of detecting an endpoint of speech may include setting a current pause duration to zero (0) at block 81. If speech is currently detected at block 82, processing may continue to the next time frame at block 83. From block 83, the method 80 returns to block 81 (e.g., where the current pause duration is set to zero while speech continues to be detected at block 82). If speech is not currently detected at block 82, an utterance hypothesis may be retrieved from the decoder at block 84. A context-based time threshold for the longest partial phrase corresponding to the utterance hypothesis may be retrieved from a database of context sensitive thresholds at block 85. If the current pause duration is less than or equal to the context-based time threshold at block 86, then the current pause duration is increased by one (1) time frame at block 87 and processing may continue at the next time frame at block 88. From block 88, the method 80 may return to block 82 (e.g., where the current pause duration continues to increase while speech is not detected). If the current pause duration is greater than the context-based time threshold at block 86, an end of utterance signal may be provided to the decoder at block 89 and the method 80 may wait for the next utterance to start at block 90. When the next utterance starts at block 90, processing may continue at block 81.

Those skilled in the art will appreciate that pause information may be stored in numerous ways. If maintained in a database, the database can likewise be represented in numerous ways. Some embodiments of a database for the pause information may include representation as a relational structure including, for example, a hash table. According to some embodiments, a database of pause information may include a representation as a finite state transducer (FST), or a WFST. Advantageously, the database representation as a WFST enables the use of weighted composition to also compute the context sensitive wait time. According to some embodiments, a database of pause information may include a non-linear function using RNN.

Figure 7:
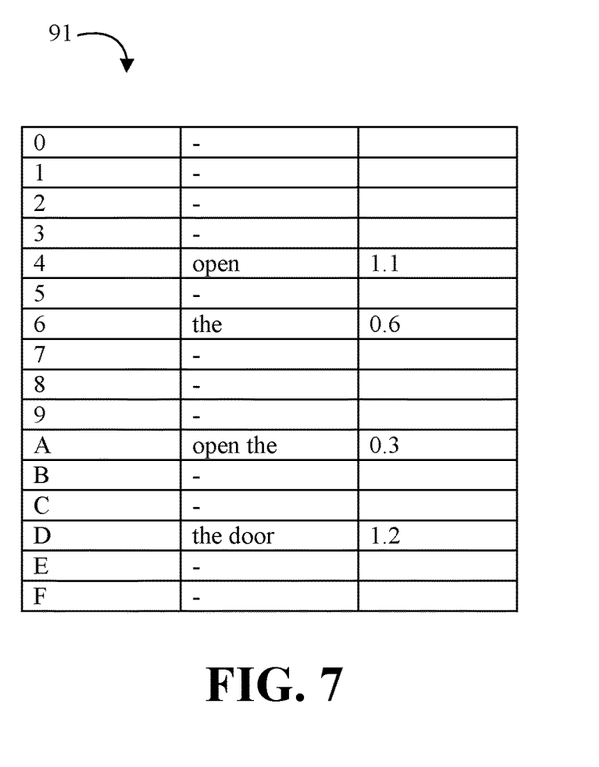
FIG. 7 is an illustration of an example of a data structure for storing pause information according to an embodiment.

Turning now to FIG. 7, an embodiment of an average pause time database may include a representation in a simplified hash table 91. The left most column of the table may correspond to a hash index, the middle column may correspond to a stored partial phrase, and the right column may correspond to a phrase duration. For the sixteen (16) entry hash table 91, the hashing function may be based on the least significant 4 bits of a 32-bit cyclic redundancy check (CRC32) hashing function, for example, as described at http://www.fileformat.info/tool/hash.htm. Of course, other hashing functions and larger tables may be used.

In order to retrieve the average pause duration of a (sub-)phrase, the hash value of that phrase is computed. Then a lookup in the hash table 91 at that position is done and it is checked, whether the phrase in the hash table 91 is equal. In that case, the phrase duration can be read, otherwise the data is not stored in the hash table. For example, the phrase "the door" may have a CRC32 of 'C738785D'. The least significant 4 bits are 'D'. The corresponding entry in the hash table shows that the stored average phrase duration of "the door" is 1.2. In this example, hashing conflicts may not be resolved. Both "door" and "the door" may have a hash index of 'D'. In this example, however only one of the two entries is stored, so that no context-based pause duration would be provided for "door". Alternatively, a list of entries could be stored under each index so that a pause duration may be stored for more than one phrase per index.

Figure 8:
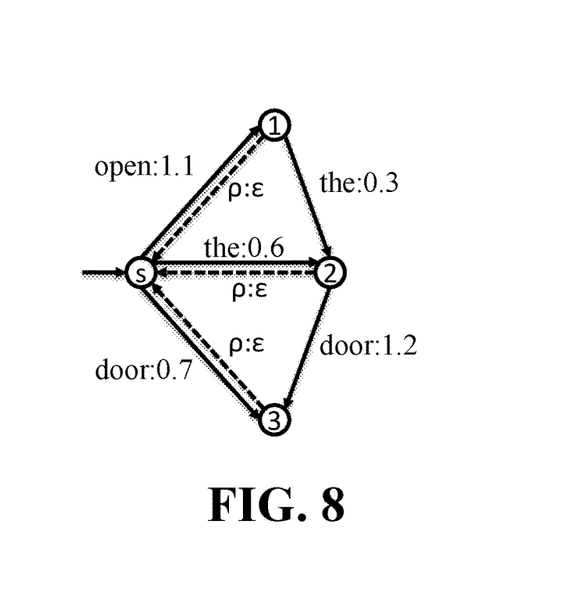
FIG. 8 is a diagram of another example of a data structure for storing pause information according to an embodiment.

Turning now to FIG. 8, an embodiment of an average pause time database may include representation in an FST. Advantageously, the pause duration may be evaluated by traversing through the FST. The input symbols of the paths (i.e. the label to the left of the colon in FIG. 8) may represent the words in the phrase. The last output symbol (i.e. the numbers to the right of the colon in FIG. 8) may be the average pause duration of the sub-phrase. In a larger FST, there may also be a failure path with "?:?" labels that is traversed if no input symbol from the current state matches any of the paths from the current state. For example, the phrase "the door" first propagates from the start state (S) through the "the:0.6" path into state two (2). From there it propagates through the "door:1.2" path. The output symbol "1.2" represents the average pause duration of the phrase "the door" as stored in the FST database.

According to some embodiments of a speech recognition system, pause duration may be modeled using sequence labeling. For example, a sequence labeling (SL) algorithm such as, for example, a recurrent neuronal network (RNN) may be utilized to determine the duration of an optional pause before the next word starts. The input for the SL may be a sequence of words with/without a pause-marker. The output may be a prediction of duration bins (e.g., 0 ms-10 ms, 10 ms-100 ms, 100 ms-200 ms, etc.). The use of pause-markers as an input feature enables a user-adaptation. Also different RNNs from different environments, e.g., user-adapted RNNs can be processed in parallel and interpolated by merging the output layer (e.g., utilizing a softmax output layer). An advantage of an SL technique as compared to a database is that it could utilize an extensive history (e.g., theoretically unlimited history). For example, there may be no arbitrary limitation for the n of the n-grams. Using an SL algorithm may also be beneficial for the robustness of the speech recognition system, for example, if the automatic speech recognition makes errors.

Some embodiments may store pause information associated with a user. For example, the user may be unknown and may simply correspond to whoever the source of speech is from. A public kiosk or automated voice response system, for example, may include a voice interface but otherwise have no data or information about who is using the kiosk or calling the automated voice response system. If the user is completely unknown, embodiments of a speech endpoint detector may begin building a set of stored pause information for the unknown user and adapt the response time based on the conversation speed of the unknown user. Substantial improvement in the user experience based on conversation speed, however, may involve a larger sample set that can be developed from a short, one-time interaction. On the other hand, some embodiments may improve the user experience with stored context-based pause information, even for unknown users. Some embodiments may include a semi-adaptive approach where an initial determination is quickly made regarding average conversation speed of the unknown user (e.g., fast, medium, slow, etc.) and setting a corresponding pause threshold based on previously determined pause statistics for the initial determination, and thereafter fine tuning or changing the pause threshold as the sample size increases. The system may also consider other information. For example, if the user was not correctly recognized previously, it may help to increase the pauses to allow more speech disfluency. An example use-case could be the kiosk with a non-native speaking person. The accent of this person may not be recognized well so that the user goes into a more word-by-word dictation mode.

For some embodiments, a user may be identified and may have user-specific pause information associated with the identified user. Numerous user interaction interfaces are feasible for establishing the identity of the user, ranging from manual (e.g., the user entering an identification into the device or machine) to completely automatic (e.g., voice recognition or facial recognition). Proxy identification is also feasible, such that the human machine interface identifies the user based on a signal received from a device in the user's possession (e.g., device recognition from a Bluetooth, Near-Field-Communication (NFC), or other wireless signal from the device). In the example of a smartphone, some embodiments may presume that the smartphone is predominantly used by a single user and all stored pause information may be associated with that user.

In the example of shared devices or services, a database of pause information may be separately maintained for each user. For example, a cloud service may maintain respective pause profiles for numerous users. A user, a device, application developers, or other services may register with and/or subscribe to the cloud service to access a particular user's profile when that user has been identified as providing voice input to a registered device. Advantageously, an embodiment of database that may be accessed from a variety of devices, applications, and/or services may increase the sample size of pauses for a particular user and reduce the need to rebuild the pause information database for the user when using a new device, application, and/or service. For example, a user carrying a smartphone may approach a public kiosk, the kiosk receives a wireless signal from the smartphone that identifies the user to the human machine interface in the kiosk, the kiosk retrieves the pause profile associated with the identified user, and when the user speaks to the kiosk the user advantageously has a better user experience because the speech recognition system of the human machine interface is adaptively adjusted to the user's average conversation speed and/or contextual partial phrase pause habits. The user identification does not necessarily include any personal identification information (e.g., name, address, birthday, etc.), but merely an identification associated with the corresponding pause profile. Some embodiments may also use a pause model selection algorithm. For example, the pause models may be clustered and each cluster can be assigned to speakers using an initial set up based on generic features like male/female, domain, audio-noise level, distraction factor, etc.

Additional Notes and Examples:

Example 1 may include a speech recognition system comprising a speech converter to convert speech from a user into an electronic signal, a feature extractor communicatively coupled to the speech converter to extract speech features from the electronic signal, a score converter communicatively coupled to the feature extractor to convert the speech features into scores of phonetic units, a decoder communicatively coupled to the score converter to decode a phrase spoken by the user based on the scores, an adaptive endpoint detector communicatively coupled to the decoder to determine if the decoded phrase spoken by the user corresponds to a complete request, and a request interpreter communicatively coupled to the decoder to interpret the complete request from the user.

Example2 may include the speech recognition system of Example 1, wherein the adaptive endpoint detector is further to retrieve pause statistics associated with the user and wherein the adaptive endpoint detector is further to adjust a pause threshold based on the pause statistics associated with the user.

Example 3 may include the speech recognition system of any one of Examples 1 or 2, wherein the adaptive endpoint detector is further to retrieve pause statistics associated with a contextual interpretation and wherein the adaptive endpoint detector is further to adjust a pause threshold based on the decoded phrase spoken by the user and the pause statistics associated with the contextual interpretation.

Example 4 may include a speech endpoint detector apparatus, comprising a speech detector to detect a presence of speech in an electronic speech signal, a pause duration measurer communicatively coupled to the speech detector to measure a duration of a pause following a period of detected speech, an end of utterance detector communicatively coupled to the pause duration measurer to detect if the pause measured following the period of detected speech is greater than a pause threshold corresponding to an end of an utterance, and a pause threshold adjuster communicatively coupled to the end of utterance detector to adaptively adjust the pause threshold corresponding to an end of an utterance based on stored pause information.

Example 5 may include the speech endpoint detector of Example 4, wherein the stored pause information includes one or more of pause information associated with a user or pause information associated with one or more contextual interpretations.

Example 6 may include the speech endpoint detector apparatus of Example 5, wherein the pause threshold adjuster is further to store the measured duration of pauses in the detected speech in the stored pause information associated with the user and to adjust the pause threshold based on the stored pause durations associated with the user.

Example 7 may include the speech endpoint detector apparatus of Example 6, wherein the pause threshold adjuster is further to determine statistics of pause durations, and wherein the stored pause information associated with the user includes a database of pause statistics associated with an identified user.

Example 8 may include the speech endpoint detector apparatus of Example 7, wherein the stored pause information includes a database having at least two sets of pause statistics respectively associated with at least two identified users.

Example 9 may include the speech endpoint detector apparatus of any one of Examples 5 to 8, wherein the stored pause information associated with the one or more contextual interpretations includes one or more of pause statistics corresponding to one or more phrase contexts, pause information corresponding to an environmental context, or pause information corresponding to a visual context.

Example 10 may include the speech endpoint detector apparatus of Example 9, wherein the stored pause information includes pause information stored in a finite state transducer.

Example 11 may include a method of detecting an endpoint of speech, comprising detecting a presence of speech in an electronic speech signal, measuring a duration of a pause following a period of detected speech, detecting if the pause measured following the period of detected speech is greater than a pause threshold corresponding to an end of an utterance, and adaptively adjusting the pause threshold corresponding to an end of an utterance based on stored pause information.

Example 12 may include the method of detecting an endpoint of speech of Example 11, wherein the stored pause information includes one or more of pause information associated with a user or pause information associated with one or more contextual interpretations.

Example 13 may include the method of detecting an endpoint of speech of Example 12, further comprising storing the measured duration of pauses in the detected speech in the stored pause information associated with the user, and adjusting the pause threshold based on the stored pause durations associated with the user.

Example 14 may include the method of detecting an endpoint of speech of Example 13, further comprising determining statistics of pause durations associated with an identified user, and storing a database of pause statistics associated with the identified user in the stored pause information associated with the identified user.

Example 15 may include the method of detecting an endpoint of speech of Example 14, further comprising storing a database having at least two sets of pause statistics respectively associated with at least two identified users.

Example 16 may include the method of detecting an endpoint of speech of any one of Examples 12 to 15, further comprising determining statistics of pause durations associated with one or more phrase contexts, and storing a database of pause statistics associated with the one or more phrase contexts in the stored pause information.

Example 17 may include the method of detecting an endpoint of speech of Example 16, further comprising storing pause information in a finite state transducer.

Example 18 may include at least one computer readable medium comprising a set of instructions, which when executed by a computing device, cause the computing device to detect a presence of speech in an electronic speech signal, measure a duration of a pause following a period of detected speech, detect if the pause measured following the period of detected speech is greater than a pause threshold corresponding to an end of an utterance, and adaptively adjust the pause threshold corresponding to an end of an utterance based on stored pause information.

Example 19 may include the at least one computer readable medium of Example 18, wherein the stored pause information includes one or more of pause information associated with a user or pause information associated with one or more contextual interpretations.

Example 20 may include the at least one computer readable medium of Example 19, comprising a further set of instructions, which when executed by a computing device, cause the computing device to store the measured duration of pauses in the detected speech in the stored pause information associated with the user, and adjust the pause threshold based on the stored pause durations associated with the user.

Example 21 may include the at least one computer readable medium of Example 20, comprising a further set of instructions, which when executed by a computing device, cause the computing device to determine statistics of pause durations associated with an identified user, and store a database of pause statistics associated with the identified user in the stored pause information associated with the identified user.

Example 22 may include the at least one computer readable medium of Example 21, comprising a further set of instructions, which when executed by a computing device, cause the computing device to store a database having at least two sets of pause statistics respectively associated with at least two identified users.

Example 23 may include the at least one computer readable medium of any one of Examples 19 to 22, comprising a further set of instructions, which when executed by a computing device, cause the computing device to determine statistics of pause durations associated with one or more phrase contexts, and store a database of pause statistics associated with the one or more phrase contexts in the stored pause information.

Example 24 may include the at least one computer readable medium of Example 23, comprising a further set of instructions, which when executed by a computing device, cause the computing device to store pause information in a finite state transducer.

Example 25 may include a speech endpoint detector apparatus, comprising means for detecting a presence of speech in an electronic speech signal, means for measuring a duration of a pause following a period of detected speech, means for detecting if the pause measured following the period of detected speech is greater than a pause threshold corresponding to an end of an utterance, and means for adaptively adjusting the pause threshold corresponding to an end of an utterance based on stored pause information.

Example 26 may include the speech endpoint detector apparatus of Example 25, wherein the stored pause information includes one or more of pause information associated with a user or pause information associated with one or more contextual interpretations.

Example 27 may include the speech endpoint detector apparatus of Example 26, further comprising means for storing the measured duration of pauses in the detected speech in the stored pause information associated with the user, and means for adjusting the pause threshold based on the stored pause durations associated with the user.

Example 28 may include the speech endpoint detector apparatus of Example 27, further comprising means for determining statistics of pause durations associated with an identified user, and means for storing a database of pause statistics associated with the identified user in the stored pause information associated with the identified user.

Example 29 may include the speech endpoint detector apparatus of Example 28, further comprising means for storing a database having at least two sets of pause statistics respectively associated with at least two identified users.

Example 30 may include the speech endpoint detector apparatus of any one of Examples 26 to 29, further comprising means for determining statistics of pause durations associated with one or more phrase contexts, and means for storing a database of pause statistics associated with the one or more phrase contexts in the stored pause information.

Example 31 may include the speech endpoint detector apparatus of Example 30, further comprising means for storing pause information in a finite state transducer.

Embodiments are applicable for use with all types of semiconductor integrated circuit ("IC") chips. Examples of these IC chips include but are not limited to processors, controllers, chipset components, PLAs, memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A speech endpoint detector apparatus, comprising:
   a speech detector including one or more of configurable logic or fixed functionality logic to detect a presence of speech in an electronic speech signal;
   a pause duration measurer including one or more of configurable logic or fixed functionality logic communicatively coupled to the speech detector to measure a duration of a pause following a period of detected speech;
   an end of utterance detector including one or more of configurable logic or fixed functionality logic communicatively coupled to the pause duration measurer to detect if the pause measured following the period of detected speech is greater than a pause threshold corresponding to an end of an utterance; and
   a pause threshold adjuster including one or more of configurable logic or fixed functionality logic communicatively coupled to the end of utterance detector to store the measured duration of pauses in the detected speech in stored pause information associated with the user and adaptively adjust the pause threshold corresponding to an end of an utterance based on stored pause durations associated with a user, wherein the pause threshold adjuster is further to determine statistics of pause durations, and wherein the stored pause information includes a database having at least two sets of pause statistics respectively associated with at least two identified users.

2. The speech endpoint detector of claim 1, wherein the stored pause information further includes pause information associated with one or more contextual interpretations.

3. The speech endpoint detector apparatus of claim 2, wherein the stored pause information associated with the one or more contextual interpretations includes one or more of pause statistics corresponding to one or more phrase contexts, pause information corresponding to an environmental context, or pause information corresponding to a visual context.

4. The speech endpoint detector apparatus of claim 3, wherein the stored pause information includes pause information associated with the user stored in a finite state transducer.

5. A speech endpoint detector apparatus, comprising:
a speech detector including one or more of configurable logic or fixed functionality logic to detect a presence of speech in an electronic speech signal;
a pause duration measurer including one or more of configurable logic or fixed functionality logic communicatively coupled to the speech detector to measure a duration of a pause following a period of detected speech;
an end of utterance detector including one or more of configurable logic or fixed functionality logic communicatively coupled to the pause duration measurer to detect if the pause measured following the period of detected speech is greater than a pause threshold corresponding to an end of an utterance; and
a pause threshold adjuster including one or more of configurable logic or fixed functionality logic communicatively coupled to the end of utterance detector to adaptively adjust the pause threshold corresponding to an end of an utterance based on stored pause information associated with a user, wherein the stored pause information further includes pause information associated with one or more contextual interpretations, and
wherein the stored pause information associated with the one or more contextual interpretations includes one or more of pause statistics corresponding to one or more phrase contexts, pause information corresponding to an environmental context, or pause information corresponding to a visual context, and
wherein the stored pause information includes pause information associated with the user stored in a finite state transducer.

6. The speech endpoint detector apparatus of claim 5, wherein the pause threshold adjuster is further to determine statistics of pause durations, and wherein the stored pause information associated with the user includes a database of pause statistics associated with an identified user.

7. The speech endpoint detector apparatus of claim 6, wherein the stored pause information includes a database having at least two sets of pause statistics respectively associated with at least two identified users.

8. A method of detecting an endpoint of speech, comprising:
detecting a presence of speech in an electronic speech signal;
measuring a duration of a pause following a period of detected speech;
detecting if the pause measured following the period of detected speech is greater than a pause threshold corresponding to an end of an utterance;
adaptively adjusting the pause threshold corresponding to an end of an utterance based on stored pause information associated with a user;
storing the measured duration of pauses in the detected speech in the stored pause information associated with the user;
adjusting the pause threshold based on the stored pause durations associated with the user;
determining statistics of pause durations associated with an identified user; and
storing a database having at least two sets of pause statistics respectively associated with at least two identified users.

9. The method of detecting an endpoint of speech of claim 8, wherein the stored pause information further includes pause information associated with one or more contextual interpretations.

10. The method of detecting an endpoint of speech of claim 9, further comprising:
determining statistics of pause durations associated with one or more phrase contexts; and
storing a database of pause statistics associated with the one or more phrase contexts in the stored pause information.

11. The method of detecting an endpoint of speech of claim 10, further comprising:
storing pause information associated with the user in a finite state transducer.

12. A method of detecting an endpoint of speech comprising:
detecting a presence of speech in an electronic speech signal;
measuring a duration of a pause following a period of detected speech;
detecting if the pause measured following the period of detected speech is greater than a pause threshold corresponding to an end of an utterance;
adaptively adjusting the pause threshold corresponding to an end of an utterance based on stored pause information associated with a user, wherein the stored pause information further includes pause information associated with one or more contextual interpretations;
determining statistics of pause durations associated with one or more phrase contexts;
storing a database of pause statistics associated with the one or more phrase contexts in the stored pause information; and
storing pause information associated with the user in a finite state transducer.

13. The method of detecting an endpoint of speech of claim 12, further comprising:
determining statistics of pause durations associated with an identified user; and
storing a database of pause statistics associated with the identified user in the stored pause information associated with the identified user.

14. The method of detecting an endpoint of speech of claim 13, further comprising:
storing a database having at least two sets of pause statistics respectively associated with at least two identified users.

15. At least one non-transitory computer readable medium comprising a set of instructions, which when executed by a computing device, cause the computing device to:
detect a presence of speech in an electronic speech signal;
measure a duration of a pause following a period of detected speech;

detect if the pause measured following the period of detected speech is greater than a pause threshold corresponding to an end of an utterance;

adaptively adjust the pause threshold corresponding to an end of an utterance based on stored pause information associated with a user;

store the measured duration of pauses in the detected speech in the stored pause information associated with the user;

adjust the pause threshold based on the stored pause durations associated with the user;

determine statistics of pause durations associated with an identified user; and store a database having at least two sets of pause statistics respectively associated with at least two identified users.

16. The at least one non-transitory computer readable medium of claim 15, wherein the stored pause information further includes pause information associated with one or more contextual interpretations.

17. The at least one non-transitory computer readable medium of claim 15, comprising a further set of instructions, which when executed by a computing device, cause the computing device to:

determine statistics of pause durations associated with one or more phrase contexts; and store a database of pause statistics associated with the one or more phrase contexts in the stored pause information.

18. The at least one non-transitory computer readable medium of claim 17, comprising a further set of instructions, which when executed by a computing device, cause the computing device to:

store pause information associated with the user in a finite state transducer.

19. At least one non-transitory computer readable medium of claim 15, comprising a set of instructions, which when executed by a computing device, cause the computing device to:

detect a presence of speech in an electronic speech signal;

measure a duration of a pause following a period of detected speech;

detect if the pause measured following the period of detected speech is greater than a pause threshold corresponding to an end of an utterance;

adaptively adjust the pause threshold corresponding to an end of an utterance based on stored pause information associated with a user, wherein the stored pause information further includes pause information associated with one or more contextual interpretations;

determine statistics of pause durations associated with one or more phrase contexts;

store a database of pause statistics associated with the one or more phrase contexts in the stored pause information; and store pause information associated with the user in a finite state transducer.

20. The at least one non-transitory computer readable medium of claim 19, comprising a further set of instructions, which when executed by a computing device, cause the computing device to:

determine statistics of pause durations associated with an identified user; and store a database of pause statistics associated with the identified user in the stored pause information associated with the identified user.

21. The at least one non-transitory computer readable medium of claim 20, comprising a further set of instructions, which when executed by a computing device, cause the computing device to:

store a database having at least two sets of pause statistics respectively associated with at least two identified users.

* * * * *